United States Patent [19]
Alves

[11] Patent Number: 5,851,281
[45] Date of Patent: Dec. 22, 1998

[54] WASTE MATERIAL COMPOSITES AND METHOD OF MANUFACTURE

[75] Inventor: Geneci Borges Alves, Santa Catarina, Brazil

[73] Assignee: K & H, Inc., Kennesaw, Ga.

[21] Appl. No.: 877,767

[22] Filed: Jun. 17, 1997

[51] Int. Cl.[6] .................................................. C04B 18/04
[52] U.S. Cl. ...................... 106/697; 106/802; 106/808; 106/810; 106/287.23; 106/287.27; 106/287.3; 106/287.32; 106/287.35; 524/650; 588/252
[58] Field of Search ..................................... 106/697, 802, 106/808, 810, 287.23, 287.27, 287.3, 287.32, 287.35; 524/650; 588/252

[56] References Cited

U.S. PATENT DOCUMENTS

| | | |
|---|---|---|
| 1,528,224 | 3/1925 | Naylor . |
| 3,483,006 | 12/1969 | Vassilevsky et al. . |
| 3,667,978 | 6/1972 | Vassilevsky et al. . |
| 3,846,366 | 11/1974 | Wallace ................... 106/697 |
| 3,892,586 | 7/1975 | Vladar et al. . |
| 3,919,017 | 11/1975 | Shoemaker et al. . |
| 4,076,873 | 2/1978 | Shea . |
| 4,133,928 | 1/1979 | Riley et al. . |
| 4,306,911 | 12/1981 | Gordon et al. . |
| 4,339,273 | 7/1982 | Meier et al. . |
| 4,382,108 | 5/1983 | Carroll et al. . |
| 4,432,666 | 2/1984 | Frey et al. ............... 106/697 |
| 4,909,849 | 3/1990 | Funderburk et al. ............ 106/697 |
| 4,961,795 | 10/1990 | Detlefsen et al. . |
| 5,002,620 | 3/1991 | King . |
| 5,102,596 | 4/1992 | Lempfer et al. . |
| 5,196,061 | 3/1993 | Thomas et al. ............... 106/697 |
| 5,312,858 | 5/1994 | Folsom ................... 106/697 |
| 5,338,357 | 8/1994 | Takai et al. . |
| 5,346,549 | 9/1994 | Johnson . |
| 5,374,474 | 12/1994 | Pratt et al. . |
| 5,415,821 | 5/1995 | Irie et al. . |
| 5,582,682 | 12/1996 | Ferretti . |
| 5,611,882 | 3/1997 | Riebel et al. . |

FOREIGN PATENT DOCUMENTS

| | | |
|---|---|---|
| 0358119 | 3/1990 | European Pat. Off. . |
| 600628 | 5/1948 | United Kingdom . |
| 892744 | 3/1962 | United Kingdom . |
| 2019854 | 3/1979 | United Kingdom . |
| 2199333 | 7/1988 | United Kingdom . |

*Primary Examiner*—Michael Marcheschi
*Attorney, Agent, or Firm*—Hinkle & Associates, P.C.

[57] ABSTRACT

A process to manufacture a waste material composite and article is described. One embodiment comprises waste material particles or fibers mixed with water to form a mash, blending a chemical binder with the mash, mixing in a cementious material and a filler agent. In another embodiment the chemical binder is added after the filler agent is added, but prior to the cemetious material. In yet another process, the mash which comprises water and paper particles is mixed with wheat residue and the chemical binder and then formed into a paper-wheat article which is pressed until cured. Still, in yet another process, rubber particles are heated, blended with the chemical binder, blended with cement, cooled, blended with ash, formed into an article and pressed until cured to form a cement-rubber composite article. The filler agent comprises calcium hydroxide, hydrated lime, carbonated lime or ash. The chemical binder comprises a mixture of water, formaldehyde, acetic acid, iodine, methanol, sodium hydroxide, ammonium carbonate and sodium hyposulfite.

119 Claims, 3 Drawing Sheets

WASTE MATERIAL COMPOSITES AND METHOD OF MANUFACTURE

BACKGROUND OF THE INVENTION

I. Field of the Invention

The present invention relates generally to the filed of construction materials. More particularly, the present invention relates to composites comprising recycable waste materals suitable for use in construction and method of manufacturing those materials.

II. Description of the Related Art

Currently, one of the most used materials in civil construction is concrete, which is actually made up of cement, sand or gravel and hydrated lime. Conventional concrete has the fundamental property of possessing good resistance to compression, in addition to having good characteristics of adherence to various surfaces with which it contacts. To improve strength and stability of concrete, it is known to place steel rods, also known as rebar, within the concrete. There have been various attempts to place other materials within the concrete to improve strength and stability.

Vladar et al. describes in U.S. Pat. No. 3,892,586 a process for the preparation of building units. This is a process to fabricate plates or boards from cellulose-containing base materials and oil distillation residues which are bound together by use of alkali metal oxide, alkaline earth metal hydroxide, alkaline earth metal oxide and a mixture thereof. The cellulose-containing base material is selected from the group of materials including rice hull, sunflower seed hull, linseed hull, peach stone shell, nut shell, peanut shell, corn stalk, sunflower stalk, corn cob, sawdust, cuttings, twig, blast fiber, wheat straw, rape straw, barley straw, ray straw, flax tow, linen harl, hemp harl, dry tobacco stalk, dry poppy stalk, cane, seedbeet vinestalk, pine needle, seedbeet stalk, seedhemp stalk, sorghum stalk, sedge and bulrush.

U.S. Pat. No. 4,133,928 issued to Riley et al. describes fiber reinforcing composites comprising Portland cement having embedded therein precombined absorbent and reinforcing fibers. The composites comprise a portland cemetitious matrix material having interwoven, twisted together, spun together or combination thereof yarn having absorbent fibers and reinforcing fibers. Cellulose is described as one of the absorbent fibers, and one source of the cellulose is described as paper fibers. The reinforcing fibers are selected from the group consisting of glass, steel, carbon, polyethylene and polypropylene. A thermoplastic coating is utilized to enhance the adhesion between the cement and the reinforcing fiber.

Lempfer et al. describes a method of producing shaped articles of fiber/binder mixtures in U.S. Pat. No. 5,102,596. The process only blends milled paper with water and uses gypsum or hydraulic cement as a binder. Apparently, no chemical binder is used other than the gypsum or hydraulic cement.

Environmentally stabilized products formed from ash and papermill waste are described in U.S. Pat. No. 5,346,549 by Johnson. As described, this process utilizes ash and papermill waste which are bound together by an oxidant selected from the group consisting of sodium perborate, sodium percarbonate, sodium hypochlorite, calcium hypochlorite, calcuim percarbonate, hydrogen peroxide and calcium peroxide to form a plastic admixture. The plastic admixture is subsequently exposed to ultraviolet radiation. Another variation of this invention utilizes portland cement to increase the strength of an article manufactured thereby.

U.S. Pat. No. 5,582,682 issued to Ferretti describes a process and a composition for making cellulosic composites. This process combines a cellulosic feedstock with a protein-containing material in the presence of ammonia or a dry ammonia-evolving compound that is heated to produce the cellulosic composite. The cellulosic feedstock is a fibrous lignocellulosic, a refined cellulosic or delignified cellulose powder or any mixture thereof. The Protein-containing material is whey, a protein-containing whey-derivative, or a flour made from pulse or a protein-rich wheat, or a mixture of these materials. Additionally, the cellulosic feedstock can be paper-recycling sludge.

SUMMARY OF THE INVENTION

In accordance with the present invention and the contemplated problems which have and continue to exist in this field, the objective of this invention are to provide a process for manufacturing a waste material composite article which is environmentally beneficial particularly when the source of the waste material is paper, tire, wheat residue, sugar cane, banana stem, rice husks, waste cellulose slurry from paper manufacturing operations and leather, which normally would be disposed of within a land fill.

One of the principal problems with concrete, which is made up of cement, sand or gravel and hydrated lime, is it has no resistance to expansion and requires that a structure formed therefrom have rebar disposed within the concrete. The result is that such a structure is excessively dense and voluminous. Therefore, it is another object of this invention to eliminate the need for rebar within certain structures fabricated with cement.

As an external facing, plaster made from cement offers good adherence to various surfaces to which it is applied. Because the plaster lacks dimensional stability, various superficial cracks often form in the plaster. Additionally, there is a low level of surface finish which results from the large amounts of sand and impurities. Furthermore, the surface can not be properly patched, because once the concrete is cured, any addition to the material will cause cracks in the surface due to the shrinking of the added material as it loses liquid during the curing process. These cracks also can result from the low resistance to traction, which keeps the two surfaces from forming a strong bond. Accordingly, it is yet another object of this invention to provide a plaster comprising a waste material composite which has good bonding characteristics and resists cracking Generally, neither cement nor concrete have good acoustical or thermal insulating properties. It is still another object of this invention to provide a waste material composite that provides improved acoustical and thermal insulating capabilities.

Still yet it is another object to provide a process for forming a chemical binder that assists in the binding of the waste material components, particularly with cement, to provide enhanced strength to the waste material composite.

This invention accomplishes the above and other objectives and overcomes the disadvantages of the prior art by providing a means and method for forming a waste material composite article that is simple in design and construction, inexpensive to fabricate, and easy to sue. In one process these composite articles are formed by mixing waste material particles or fibers with water to form a mash, blending a chemical binder with the mash and then adding cement. Afterwards, calcuim hydroxide, hydrated lime, carbonated lime or ash is mixed therein and the composite is poured into a mold or extruded to form a cement-waste material composite article. In another process the chemical binder is added after calcium hydroxide, hydrated lime, carbonated lime or ash is mixed with the mash. In yet another process, the mash which comprises water and paper aprticles is mixed with wheat residue and the chemical binder and then formed into a paper-wheat article which is pressed until cured. Still, in yet another process, rubber particles are heated, blended with the chemical binder, blended with cement, cooled, blended with ash, calcium hydroxide, hydrated lime, carbonated lime, wheat residue or ground yucca, formed into an article and pressed until cured to form a cement-rubber composite article. The chemical binder comprises a mixture of water ($H_2O$), formaldehyde ($CH_2O$), acetic acid ($HC_2H_3O_2$), Iodine ($I_2$), methanol ($CH_3OH$), sodium hydroxide (NaOH), ammonium carbonate (($N_2H_4$)$_2CO_3$) and sodium hyposulfite ($Na_2H_2SO_3$).

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein.

DESCRIPTION OF THE PREFERRED EMBODIMENTS

Figure 1:
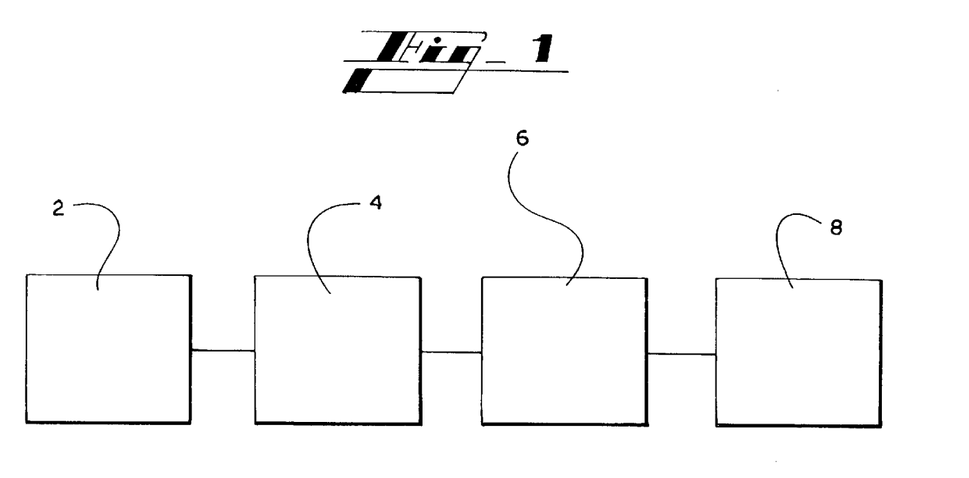
FIG. 1 is a flow schmatic showing the steps of grinding or shreading, hydrating, mixing and forming an article made in accordance with the present intention.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a process of manufacturing a cement-waste material composite made in accordance with the present invention. In one embodiment of the present invention, the process for creating the cement-paper composite comprises basically the conduction of the waste material through a grinder 2 where the waste material is processed until reaching a particle size or fiber length adequate to promote the maximum interaction between the fibers of the waste material, which varies from coarse to powdery depending on the final use of the product, to generally form a particlized waste material. The particlized waste material is then placed into a container 4 and mixed with water to form a mash. The mash, after resting for a period of time, is placed into a mixer 6 and a chemical binder is added and thoroughly mixed into the mash. A cementious material, preferably portland cement, and a filler agent is then added to the mixer 6 and thoroughly mixed with the mash and chemical binder to form a cement-waste material composite. A cement-waste material composite article can then be manufactured utilizing a forming apparatus 8, which is accomplished either by pouring the cement-waste material composite into a mold or by extruding the cement-waste material composite and then allowing the cement-waste material composite to cure, with or without pressing. Pressing is conducted by applying a predetermined pressure upon the the article, which forces fluid from the cement-waste material composite to increase the density and increases structural strength of the composite.

In another embodiment of the present invention, the filler agent is mixed into the composite prior to the addition of the cementitious material.

Yet, in another embodiment of the present invention, a composite of paper and wheat residue is manufactured. The mash comprises water and paper particles. Wheat residue and the chemical binder are blended with the mash to form the paper-wheat composite. Afterwards, the paper-wheat composite is pressed to form a paper-wheat composite article.

Figure 2:
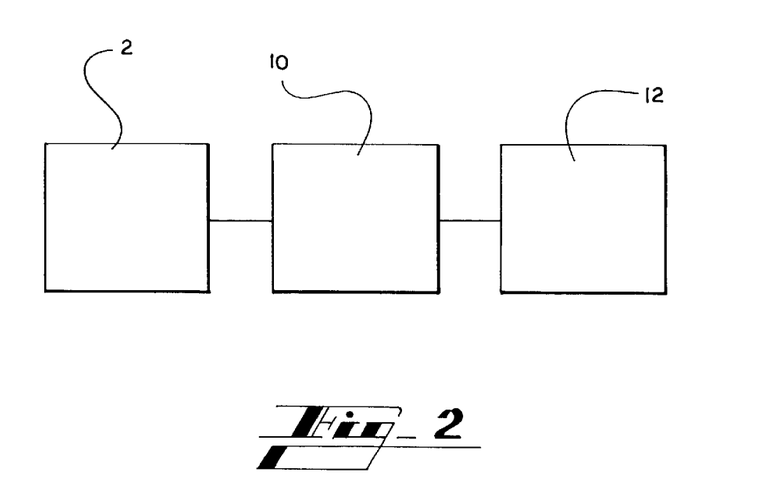
FIG. 2 is another flow schmatic showing the steps of grinding with a grinder, heating, mixing and cooling with a rotating oven, and forming a cement-rubber composite article made in accordance with the present invention.

Still, in another embodiment of the present invention, a cement-rubber composite is manufactured. A rubber product, such as vehicle tires, is ground into particlized rubber. Then, the particlized rubber is placed into a rotating oven and heated. The chemical binder is throughly mixed with the particlized rubber, followed by the addition of a cementitious material. Finally, a filler agent is blended with the composite to form the cement-rubber composite material. To form a cement-rubber composite material article, the shaped cement-rubber composite is pressed.

The waste material composites can be used, for example, to construct structural framing, plaster, walls, foundations, tiles, roofs, pellets, slabs, panels, blocks, curbs, pillars, thermo-acoustic insulation, decorative coating, cylinders and roadways. These examples are only illustrative, and the use of the waste material composites are not limited to these examples.

The chemical binder is manufactured by a process comprising the following steps:

(a) Placing water into a first vessel in an amount between 4 to 6 liters, preferably 5 liters;

(b) Mixing formaldehyde ($CH_2O$) into the water in an amount between 60 to 140 milliliters, preferably 100 milliliters, to form a water-formaldehyde solution;

(c) Mixing acetic acid ($HC_2H_3O_2$) into the water-formaldehyde solution in an amount between 10 to 30 milliliters, preferably 20 milliliters, to form an acid solution;

(d) Resting the acid solution for a period of at least 20 minutes;

(e) Mixing and dissolving caustic soda (NaOH) into the acid solution in an amount between 500 grams to 1500 grams, preferably 1000 grams, to form a neutralized solution;

(f) Mixing and reacting ammonium carbonate (($N_2H_4$)$_2CO_3$) into the neutralized solution in an amount between 50 grams to 110 grams, preferably 80 grams, to form an ammonium solution;

(g) Placing methanol ($CH_3OH$) into a second vessel in an amount between 35 milliliters to 65 milliliters, preferably 50 milliliters;

(h) Mixing and dissolving iodine ($I_2$), preferably granulated iodine, into the methanol in an amount between 10 grams and 30 grams, preferably 20 grams, to form an iodine solution;

(i) Mixing the ammonium solution and the iodine solution to form a base solution; and, (j) Mixing and reacting sodium hyposulfite ($NaH_2SO_3$) into the base solution in an amount between 25 grams to 55 grams, preferably 40 grams, to form the liquid chemical binder.

The process for manufacturing the chemical binder is based upon the initial volume of water, which is preferably based upon 5 liters of water. Accordingly, if the amount of water is more or less than 4 to 6 liters, the amounts of formaldehyde, acetic acid, caustic soda, ammonium carbonate, methanol, iodine and sodium hyposulfite should be proportionally increased or decreased, respectively. Upon the addition of ammonium carbonate in step (f), the reaction produces a boiling-like appearance with foam. When iodine is added to methanol, the iodine solution has a deep red color. After the iodine solution is mixed with the ammonium solution, the base solution has a red color as well. Sodium hyposulfite generally should be allowed to react for at least 30 minutes with the base solution. Additionally, during the endothermic reaction of the sodium hyposulfite with the base solution, a characteristic odor of sulfur is detected. Upon the completion of the sodium hyposulfite and base solution reaction, the chemical binder is generally colorless. Also, the chemical binder generally has a pH of approximately 13.

Ash is the preferred filler agent utilized in the present invention. Other compounds which can be utilized as the filler agent are calcium hydroxide ($Ca(OH)_2$), hydrated lime (CaO) and carbonated lime ($CaCO_3$). In the process of manufacturing a cement-rubber composite, wheat residue and ground yucca root can be also utilized as the filler agent. Ground yucca root is a very fine powder having the consistancy of talcum powder. Ash is preferably recovered from coal burning operations. When coal is burned, there are two types of ash formed. Wet ash, which is the heavy residue that falls downwardly from the coal burning operation and remains in a coal burning furnace. Fly ash is the ash that is very light and comprises very fine particles that escape with flue gas through an exhaust stack or chimney. Typically, this ash is recovered by scrubbing operations of the flue gas with the combination of scrubbers and separators. Although not required, both the wet ash and fly ash are dehydrated prior to use in current invention. When the desired composite article contains rebar, which supplies additional structural intregrety, wet ash is preferred due to its ability assist the chemical binder and the cement in forming a strong adherance to the rebar and increased composite article density.

A particularly difficult paper product to recycle in paper making operations is aluminized paper. This paper is commonly used with process foods, such as juice and milk cartons and special packaging for perishable food products. Aluminized paper is difficult to recycle because at least one side of the paper has a thin layer of aluminum tightly bonded thereto. This type of paper has shown excellent results when used to form one of the composites of the present invention.

The cement-aluminized paper composite is manufactured by a process comprising the following steps:

(a) Conducting the aluminized paper to a grinder 2;

(b) Grinding the aluminized paper to form particlized paper of 5 mm or less in size, preferably 2 mm;

(c) Placing the particlized paper into a container 4;

(d) Placing water in an amount between 50% to 95% by weight of the particlized paper into the container 4;

(e) Mixing the water and particlized paper thoroughly to form a mash;

(f) Resting the mash for a period between 12 to 24 hours.

(g) Placing the mash into a mixer 6;

(h) Blending the mash with a chemical binder in an amount of 10 milliliters to 80 milliliters of chemical binder per 10 liters to 50 liters of mash for a period of 15 to 30 minutes, preferably 20 minutes, to form a mash/chemical binder mixture;

(i) Adding and mixing thoroughly a cementitious material, preferably portland cement, with the mash/chemical binder mixture in an amount of 30% to 90% by weight of mash to form a mash/cement mixture; and, (j) Adding and mixing thoroughly a filler agent selected from the group consisting of calcium hydroxide ($Ca(OH)_2$), hydrated lime (CaO), carbonated lime ($CaCO_3$) and ash with the mash/cement mixture in an amount between 10% and 60% by weight of cement, preferably between 30% and 40% by weight of cement, to form a cement-paper composite.

It is preferred, although not required, for the aluminized paper to be ground prior to hydration. The mash should be allowed to rest for the 12 to 24 hour period so that the particlized paper becomes completely saturated with water prior to adding the chemical binder. A cement-aluminized paper composite article can be manufactured by either extruding the cement-aluminized paper composite, placing the cement-aluminized paper composite into a mold or manually shaping the cement-aluminized paper composite into a desired shape and allowing the cement-aluminized paper article to cure for a period of 2 to 15 days. Clearly, curing time is less for small articles. Pressing of the article is described below.

The following alternate method of manufacturing a cement-paper composite, which can also utilize the aluminized paper, comprises the following steps:

(a) Conducting the paper to a grinder 2;

(b) Grinding the paper to form particlized paper of 5 mm or less in size, preferably 2 mm;

(c) Placing the particlized paper into a container 4;

(d) Placing water in an amount between 50% to 95% by weight of the particlized paper into the container 4;

(e) Mixing the water and particlized paper thoroughly to form a mash;

(f) Resting the mash for a period between 12 to 24 hours;

(g) Placing the mash into a mixer 6;

(h) Blending and mixing the mash with ash in an amount of 15% to 50%, preferably 30%, of the volume of the cement-paper composite for preferably at least 10 minutes to form an mash/ash mixture;

(i) Blending and mixing the mash/ash mixture with a chemical binder in an amount of 0.5% to 5%, preferably about 1%, of the volume of the cement-paper composite for a period of 15 to 30 minutes, preferably 15 minutes, to form a mash/ash/binder mixture;

(j) Blending and throughly mixing the mash/ash/binder mixture with a cementious material in an amount of 14% to 49%, preferably 29%, of the volume of the cement-paper composite to form the cement-paper composite.

As with the previously described process, a cement-paper composite article can be manufactured by either extruding the cement-paper composite, placing the cement-paper composite into a mold or manually shaping the cement-paper composite into a desired shape and allowing the cement-paper article to cure for a period of 2 to 15 days. Clearly, curing time is less for small articles. Pressing of the article is described below.

In either of the processes described above, the paper or the aluminized paper can be substituted with fiberous materials capable of absorbing water. For example, paper can be substituted with sugar cane, banana stems, rice husks, waste cellulose slurry from paper manufacturing operations, and leather. The materials of this list are not encompassing and clearly, other fiberous, water absorbing materials, especially comprising vegetable matter, may be used in the present invention. Sugar cane and banana stems are prepared for use by washing with water, preferably hot water at about 150 degrees C., to remove residue sugar or sap and then grinding or shredding with a shreader the cane or stems into fibers having lengths of 2 to 3 millimeters and a typical diameter of 0.5 millimeters. Washing the banana stems with a pressurized water stream of about 300 psi is preferred. Rice husks are prepared by roasting the husks at approximately 600 degrees C. in an enclosed oven or chamber without the presence of oxygen for a period from about 30 minutes to 75 minutes, preferably 60 minutes, to produce micro-granules of rice husks. The micro-granules of rice husks have a consistancy of a very fine powder similiar to talcum powder. Waste cellulose slurry is ready for use without any further processing. Leather is prepared for use in the same manner as paper, that is, by grinding the leather to form leather particles having a size of up to 5 millimeters, preferably 2 millimeters.

In the previous two processes, amounts of the chemical binder in excess of about 1% by volume of the cement-waste material composite can result in cracking of the cement-waste material article.

In yet another embodiment of the present invention, paper and wheat residue are combined with the chemical binder to produce a paper-wheat composite. The wheat residue is produced as a waste product in grist mills and typically comprises flour, grains of wheat and wheat husks. A process for manufacturing the paper-wheat composite comprises the steps of:

(a) Conducting the paper to a grinder 2;
(b) Grinding the paper to form particlized paper of 5 mm or less in size, preferably 2 mm;
(c) Placing the particlized paper into a container 4;
(d) Placing water in an amount between 50% to 95% by weight of the particlized paper into the container 4;
(e) Mixing the water and particlized paper thoroughly to form a mash;
(f) Resting the mash for a period between 12 to 24 hours;
(g) Placing the mash into a mixer 6;
(h) Blending and mixing wheat residue in an amount of 15% to 33%, preferably 18%, of the volume of the paper-wheat composite for a period of 15 minutes to 30 minutes, preferably 20 minutes, to form a paper/wheat mixture;
(i) Blending and mixing the paper/wheat mixture with a chemical binder in an amount of 1% to 7%, preferably about 2%, of the volume of the paper-wheat composite for a period of 15 minutes to 30 minutes to form a paper-wheat composite.

A paper-wheat composite article is manufactured by either extruding the paper-wheat composite, placing the paper-wheat composite into a mold or manually shaping the paper-wheat composite into a desired shape and then curing the paper-wheat article by pressing the shaped cement-paper composite. Pressing of the article is described below.

Still in another embodiment of the present invention, rubber and rubber derivative products, such as tires, can also be used with the chemical binder and cement to form a cement-rubber composite which comprises 40% to 60%, preferably 50%, of the volume of the cement-rubber composite. Steel belted radial tires may be utilized to form the cement-rubber composite. Refering now to FIG. 2, a process for manufacturing the cement-rubber composite comprises the following steps:

(a) Conducting a rubber product to a grinder 2;
(b) Grinding the rubber product to form a particlized rubber having a size between 2 millimeters to 8 millimeters, preferably 5 millimeters;
(b) Conveying the particlized rubber to a rotating oven 10;
(c) Rotating and heating the particlized rubber to a homogeneous temperature between 100 and 150 degrees C.;
(d) Blending and mixing the particlized rubber in the rotating oven with the chemical binder in an amount of 3% to 3%, preferably 5%, of the volume of the cement-rubber composite for a period of preferrably at least 60 minutes to form a rubber/binder mixture;
(e) Blending and mixing the rubber/binder mixture with a cementitious material, preferably portland cement, in an amount of 8% to 25%, preferably 15%, of the volume of the cement-rubber composite to form a rubber/binder/cement mixture;
(f) Cooling immediately the rubber/binder/cement mixture to about 50 degrees C. while continuing to mix the rubber/binder/cement mixture for a period of 10 mixtures to 30 minutes, preferably 18 minutes;
(g) Blending and mixing the rubber/binder/cement mixture with a filler agent selected from the group consisting of ash, calcium hydroxide ($Ca(OH)_2$), hydrated lime (CaO), carbonated lime ($CaCO_3$), wheat residue and ground yucca, preferably ash, for a period of 5 minutes to 15 minutes, preferably 10 minutes, to form a cement-rubber composite.

A cement-rubber composite article is manufactured by either extruding the cement-rubber composite, placing the cement-rubber composite into a mold or manually shaping the cement-rubber composite into a desired shape and then curing the cement-rubber article by pressing the shaped cement-rubber composite. Pressing of the article is described below.

Figure 3:
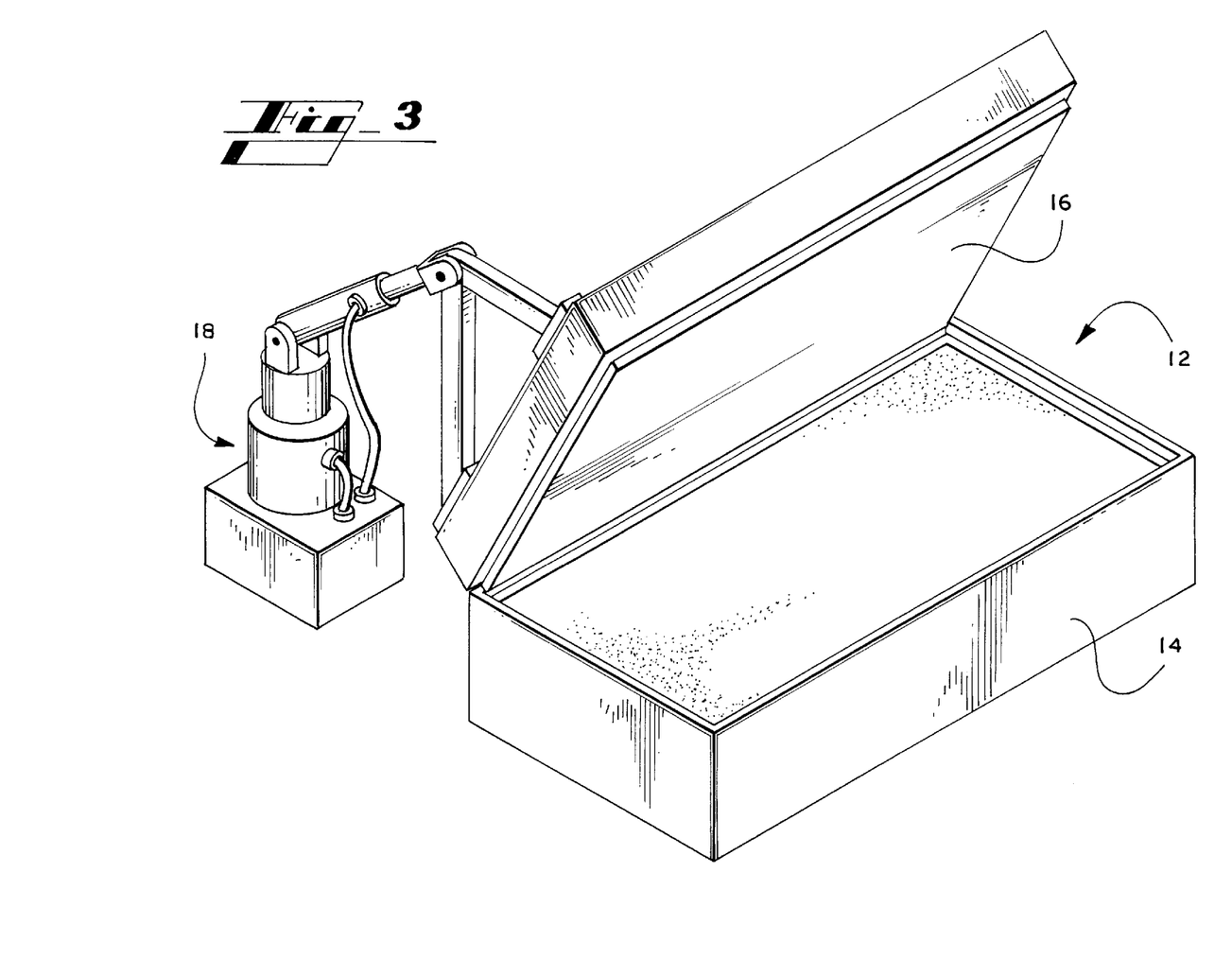
FIG. 3 is a perspective view of a pressing device utilized in the present invention.
Figure 4:
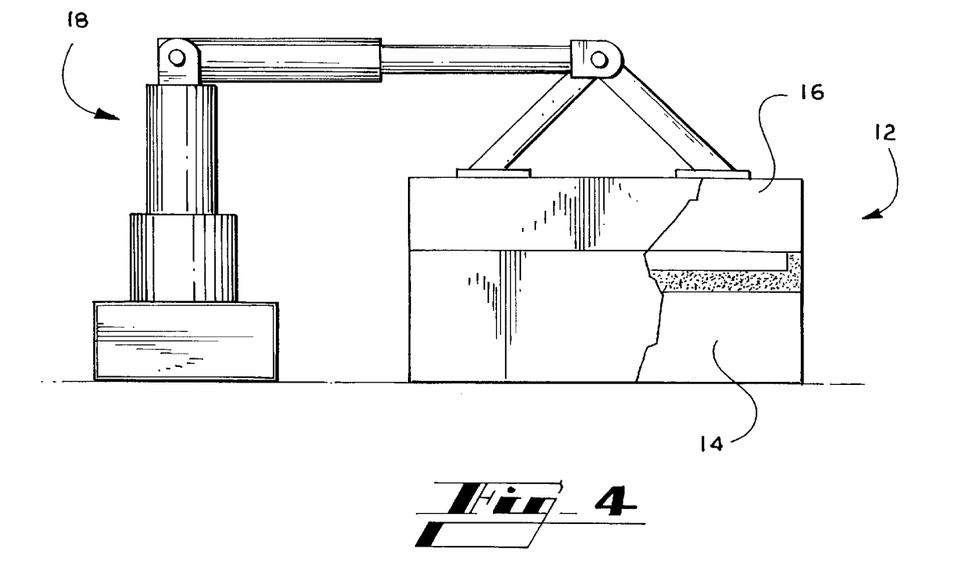
FIG. 4 is a side elevation view of the pressing device of FIG. 3 pressing a waste-material composite article made in accordance with the present invention.
Figure 5:
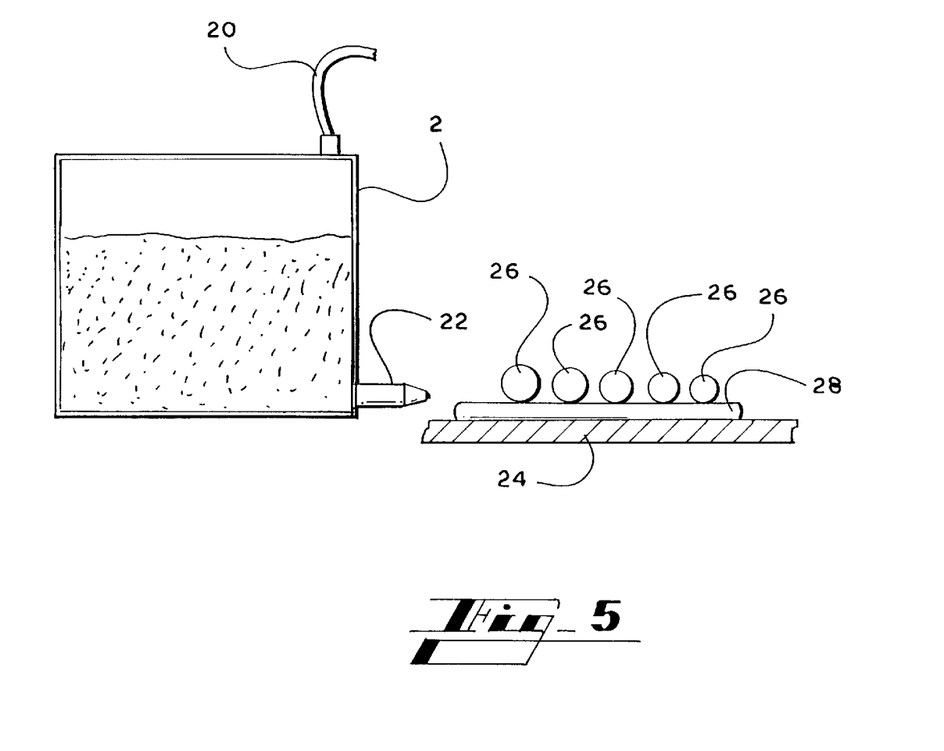
FIG. 5 is a side elevation of an extruding apparatus and pressing rollers utilized in the present invention.

To form a cement-sugar cane, cement-wheat, paper-wheat, or cement rubber composite article, the shaped article should be pressed at a pressure of 10 kilograms to 200 kilograms per square centimeter of pressed article surface area. As shown in FIG. 3, a pressing device 12 comprises a pressing form 14 and a pressing plate 16. A hydraulic or compressed air jack 18 energizes the pressing plate 16. The waste material composite is disposed into the pressing form 14 and the pressing plate 16 is pressed into contact with the waste material composite at a desired pressure, as shown in FIG. 4. Referring now to FIG. 5, the container 2 is shown with a compressed air line 20 and an extruder portion 22. The waste material composite is disposed in the container 2, the container 2 is pressurized to a pressure of 10 to 200 kilograms per square centimeter, and the waste material composite is extruded onto a platform 24, preferably a moving platform. Also sown in FIG. 5 are pressing rollers 26. The pressing rollers 26 are a series of rollers which apply increasing pressure to the roller pressed waste material composite article 28. When utilizing one or more pressing rollers, it is not necessary to pressurize the container 2. As previously stated, a pressure of 10 to 200 kilograms per square centimeter of pressed article surface area is sufficient. The amount of pressure is determined by the desired density of the cured article and/or the desired structural strength of the cured article. Higher pressures result in a cured article having a greater density. The curing time for pressed articles is between about 2 hours to 2 days, depending upon the size of the article. Without pressing, the curing time is between 2 to 15 days, again depending upon the size of the article. Larger articles require longer times to cure.

EXAMPLE

A waste material composite comprising, by volume percentage of the composite, cement 29%, paper 40%, calcium hydroxide 40% and chemical binder 1% subjected to compression with a 450,000 pound hydraulic Universal Testing Machine with a loading rate of approximately 2000 psi per minute. The results are as follows:

| Dimensions (cm) | Compressive Strength | | Loading Time |
| --- | --- | --- | --- |
|  | MPa | psi | min. |
| 7.5 cube | 30.86 | 4473 | 3 |
| 15 × 15 × 15.5 cube | 28.95 | 4195 | 3 |
| 15 × 15 × 15.5 cube | 26.84 | 3890 |  |

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Mixing and blending periods should be conducted at least until homogeneous mixing occurs.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A process for manufacturing a liquid chemical binder, comprising the steps of:
    (a) Mixing water and formaldehyde ($CH_2O$) to form a water-formaldehyde solution;
    (b) Mixing acetic acid ($HC_2H_3O_2$) and the water-formaldehyde solution to form an acid solution;
    (c) Mixing and dissolving caustic soda (NaOH) into the acid solution to form a neutralized solution;
    (d) Mixing and reacting ammonium carbonate (($N_2H_4$)$_2CO_3$) into the neutralized solution to form an ammonium solution;
    (e) Mixing the ammonium solution and an iodine solution to form a base solution; and,
    (f) Mixing and reacting sodium hyposulfite ($NaH_2SO_3$) into the base solution to form the liquid chemical binder.

2. A process as claimed in claim 1, wherein the iodine solution is manufactured by the step comprising:
    Mixing and dissolving iodine ($I_2$) into methanol ($CH_3OH$) to form the iodine solution.

3. A process as claimed in claim 1, further comprising the step of holding the acid solution for a period of at least 20 minutes after step (b).

4. A process as claimed in claim 1, wherein the amount of formaldehyde is between 60 milliliters to 140 milliliters for every 4 to 6 liters of water.

5. A process as claimed in claim 1, wherein the amount of acetic acid is between 10 millileters to 30 milliliters for every 4 to 6 liters of water.

6. A process as claimed in claim 1, wherein the amount of caustic soda is between 500 grams to 1500 grams for every 4 to 6 liters of water.

7. A process as claimed in claim 1, wherein the amount of ammonium carbonate is between 50 grams to 110 grams for every 4 to 6 liters of water.

8. A process as claimed in claim 2, wherein the amount of methanol is between 35 millileters to 65 millileters for every 4 to 6 liters of water.

9. A process as claimed in claim 2, wherein the amount of iodine is between 25 grams to 55 grams for every 4 to 6 liters of water.

10. A process as claimed in claim 1, wherein the amount of sodium hyposulfite is between 25 grams to 55 grams for every 4 to 6 liters of water.

11. A chemical binder made by combining chemicals, comprising:
    (a) water;
    (b) formaldehyde ($CH_2O$);
    (c) acetic acid ($HC_2H_3O_2$);
    (d) caustic soda (NaOH);
    (e) ammonium carbonate (($N_2H_4$)$_2CO_3$);
    (f) methanol ($CH_3OH$);
    (g) iodine ($I_2$); and,
    (g) sodium hyposulfite ($NaH_2SO_3$).

12. A process for manufacturing a cement-waste material composite, comprising the steps of:
    (a) Placing a waste material into a container;
    (b) Placing water in an amount between 50% to 95% by weight of the waste material into the container;
    (c) Mixing the water and waste material thoroughly to form a mash;
    (d) Blending and mixing the mash with a chemical binder according to claim 11 in an amount of 10 milliliters to 80 milliliters of chemical binder per 10 liters to 50 liters of mash to form a mash/chemical binder mixture;
    (e) Adding and mixing thoroughly a cement material with the mash/chemical binder mixture in an amount of 30% to 90% by weight of mash to form a mash/cement mixture; and,
    (f) Adding and mixing thoroughly a filler agent with the mash/cement mixture in an amount between 10% and 60% by weight of cement material to form a cement-waste material composite.

13. A process as claimed in claim 12, wherein prior to the step of blending and mixing the mash with the chemical binder the mash is held for a period between 12 to 24 hours.

14. A process as claimed in claim 12, wherein the mash and the chemical binder are blended and mixed for a period between 15 and 30 minutes.

15. A process as claimed in claim 12, wherein the waste material comprises of paper, aluminized paper, sugar cane, banana stem, rice husk, cellulose slurry, leather or wheat residue.

16. A process as claimed in claim 12, wherein the waste material is paper and prior to the step of placing the paper in the container, the paper is placed in a grinder; and ground into paper particles having a size of up to 5 millimeters.

17. A process as claimed in claim 12, wherein the waste material is paper particles and the paper particles have a size up to 5 millimeters.

18. A process as claimed in claim 12, wherein the waste material is paper particles and the paper particles have a size of about 2 millimeters.

19. A process as claimed in claim 16, wherein the paper particles have a size of about 2 millimeters.

20. A process as claimed in claim 12, wherein the waste material is rice husk and prior to the step of placing the rice husk in the container, the rice husk is placed into an enclosed chamber; and heated at approximately 600 degrees C., in the absence of oxygen, to produce micro-granules of rice husk.

21. A process as claimed in claim 20, wherein the rice husk is heated for a period of 30 minutes to 75 minutes.

22. A process as claimed in claim 12, wherein the waste material is micro-granules of rice husk.

23. A process as claimed in claim 12, wherein the waste material is sugar cane and prior to the step of placing the sugar cane in the container, the sugar cane is washed;

placed in a grinder; and ground to form sugar cane fibers.

24. A process as claimed in claim 23, wherein the sugar cane fibers have a length between 2 to 3 millimeters and diameter of about 0.5 millimeters.

25. A process as claimed in claim 23, wherein the sugar cane is washed with water at a temperature of about 150 degrees C.

26. A process as claimed in claim 12, wherein the waste material is sugar cane fibers.

27. A process as claimed in claim 12, wherein the waste material is banana stem and prior to the step of placing the banana stem in the container, the banana stem is washed;

placed in a shredder; and shredded to form banana stem fibers.

28. A process as claimed in claim 27, wherein the banana stem fibers have a length between 8 centimeters and 20 centimeters.

29. A process as claimed in claim 12, wherein the waste material is banana stem fibers.

30. A process as claimed in claim 12, wherein the waste material is aluminized paper.

31. A process as claimed in claim 12, wherein the waste material is aluminized paper and prior to the step of placing the aluminized paper in the container, the aluminized paper is placed in a grinder; and ground into paper particles having a size of up to 5 millimeters.

32. A process as claimed in claim 12, wherein the waste material is aluminized paper particles having a size of up to 5 millimeters.

33. A process as claimed in claim 12, wherein the waste material is aluminized paper particles having a size of about 2 millimeters.

34. A process claimed in claim 12, wherein the waste material is leather and prior to the step of placing the leather in the container, the leather is placed in a grinder; and ground to form leather particles having a size of up to 5 millimeters.

35. A process as claimed in claim 12, wherein the filler agent is selected from the group consisting of calcium hydroxide ($Ca(OH)_2$), hydrated lime (CaO), carbonated lime ($CaCO_3$) and ash.

36. A process as claimed in claim 12, wherein the filler agent is present in an amount between 30% and 40% by weight of the cement material.

37. A process of claimed in claim 12, wherein the cement material is portland cement.

38. A process as claimed in claim 12, further comprising the steps of:

Forming the cement-waste material composite into a shape; and,

Curing the shaped cement-waste material composite to form a cement-waste material article.

39. A process as claimed in claim 38, further comprising the step of pressing the cement-waste material article.

40. A process as claimed in claim 39, wherein the cement-waste material article is pressed at a pressure between 10 kilograms and 200 kilograms per square centimeter.

41. A process as claimed in claim 38, wherein the cement-waste material is formed by extruding the cement-waste composite.

42. A process as claimed in claim 41, wherein the cement-waste material composite is extruded at a pressure between 10 kilograms and 200 kilograms per square centimeter.

43. A process as claimed in claim 38, wherein the cement-waste material is formed by pressing at a pressure between 10 kilograms and 200 kilograms per square centimeter.

44. A process as claimed in claim 38, wherein the cement-waste material is formed by placing the cement-waste composite into a mold.

45. A process as claimed in claim 44, further comprising the step of pressing the cement-waste material at a pressure between 10 kilograms and 200 kilograms per square centimeter after the cement-waste material is placed into the mold.

46. A process as claimed in claim 38, wherein forming the cement-waste material is conducted by manually shaping the cement-waste composite.

47. A process for manufacturing a cement-waste material composite comprising the steps of:

(a) Placing a waste material into a container;

(b) Placing water in an amount between 50% to 95% by weight of the waste material into the container;

(c) Mixing the water and waste material thoroughly to form a mash;

(d) Blending and mixing the mash with a filler agent in an amount of 15 to 50% by volume of the cement-waste material composite to form an mash/filler mixture;

(e) Blending and mixing the mash/filler mixture with a chemical binder according to claim 11 in the amount of 0.5 to 5 % by volume of the cement-waste material composite to form a mash/filler/binder mixture; and, (f) Blending and mixing the mash/filler/binder mixture with a cement material in an amount of 14 to 49 % by volume of the cement-waste material composite to form the cement-waste composite.

48. A process as claimed in claim 47, wherein prior to the step of blending and mixing the mash with a filler agent the mash is held for a period between 12 to 24 hours.

49. A process as claimed in claim 47, wherein the mash and the filler agent are blended and mixed for a period of at least 10 minutes prior to conducting step (e).

50. A process as claimed in claim 47, wherein the mash/filler/binder mixture is blended and mixed with the cement material for a period of between 15 and 30 minutes.

51. A process as claimed in claim 47, wherein the waste material comprises paper, aluminized paper, sugar cane, banana stem, rice husk, cellulose slurry, leather or wheat residue.

52. A process as claimed in claim 47, wherein the waste material is paper and prior to the step of placing the paper in the container,
the paper is placed in a grinder; and
ground into paper particles having a size of up to 5 millimeters.

53. A process as claimed in claim 47, wherein the waste material is paper particles and the paper particles have a size up to 5 millimeters.

54. A process as claimed in claim 47, wherein the waste material is paper particles and the paper particles have a size of about 2 millimeters.

55. A process as claimed in claim 52, wherein the paper particles have a size of about 2 millimeters.

56. A process as claimed in claim 47, wherein the waste material is rice husk and prior to the step of placing the rice husk in the container,
the rice husk is placed into an enclosed chamber; and
heated at approximately 600 degrees C., in the absence of oxygen, to produce micro-granules of rice husk.

57. A process as claimed claim 56, wherein the rice husk is heated for a period of 30 minutes to 75 minutes.

58. A process as claimed in claim 47, wherein the waste material is micro-granules of rice husk.

59. A process as claimed in claim 47, wherein the waste material is sugar cane and prior to the step of placing the sugar cane in the container,
the sugar cane is washed;
placed in a grinder; and
ground to form sugar cane fibers.

60. A process as claimed in claim 59, wherein the sugar cane fibers have a length between 2 to 3 millimeters and a diameter of approximately 0.5 millimeters.

61. A process as claimed in claim 59, wherein the sugar cane is washed with water at a temperature of about 150 degrees C.

62. A process as claimed in claim 47, wherein the waste material is sugar cane fibers.

63. A process as claimed in claim 47, wherein the waste material is banana stem and prior to the step of placing the banana stem in the container,
the banana stem is washed;
placed in a shredder; and
shredded to form banana stem fibers.

64. A process as claimed in claim 63, wherein the banana stem fibers have a length between 8 centimeters and 20 centimeters.

65. A process as claimed in claim 47, wherein the waste material is banana stem fibers.

66. A process as claimed in claim 47, wherein the waste material is aluminized paper.

67. A process as claimed in claim 47, wherein the waste material is aluminized paper and prior to the step of placing the aluminized paper in the container,
the aluminized paper is placed in a grinder; and
ground into paper particles having a size of up to 5 millimeters.

68. A process as claimed in claim 47, wherein the waste material is aluminized paper particles having a size of up to 5 millimeters.

69. A process as claimed in claim 47, wherein the waste material is aluminized paper particles having a size of approximately 2 millimeters.

70. A process as claimed in claim 47, wherein the waste material is leather and prior to the step of placing the leather in the container,
the leather is placed in a grinder; and
ground to form leather particles having a size of up to 5 millimeters.

71. A process as claimed in claim 47, wherein the filler agent is selected from the group consisting of calcium hydroxide ($Ca(OH)_2$), hydrated lime (CaO), carbonated lime ($CaCO_3$) and ash.

72. A process as claimed in claim 47, wherein the filler agent is present in an amount between 30% and 40% by weight of the cement material.

73. A process as claimed in claim 47, wherein the cement material is portland cement.

74. A process as claimed in claim 47, further comprising the steps of:
Forming the cement-waste material composite into a shape; and,
Curing the shaped cement-waste material composite to form a cement-waste material article.

75. A process as claimed in claim 74, further comprising the step of pressing the cement-waste material article.

76. A process as claimed in claim 75, wherein the cement-waste material article is pressed at a pressure between 10 kilograms and 200 kilograms per square centimeter.

77. A process as claimed in claim 74, wherein the cement-waste material is formed by extruding the cement-waste composite.

78. A process as claimed in claim 77, wherein the cement-waste material composite is extruded at a pressure between 10 kilograms and 200 kilograms per square centimeter.

79. A process as claimed in claim 74, wherein the cement-waste material is formed by pressing at a pressure between 10 kilograms and 200 kilograms per square centimeter.

80. A process as claimed in claim 74, wherein the cement-waste material is formed by placing the cement-waste composite into a mold.

81. A process as claimed in claim 80, further comprising the step of pressing the cement-waste material at a pressure between 10 kilograms and 200 kilograms per square centimeter after the cement-waste material is placed into the mold.

82. A process as claimed in claim 74, wherein forming the cement-waste material is conducted by manually shaping the cement-waste composite.

83. A process for manufacturing a paper-wheat composite comprising the steps of:
(a) Placing paper into a container;
(b) Placing water in an amount between 50% to 95% by weight of the paper into the container;
(c) Mixing the water and paper thoroughly to form a mash;
(d) Blending and mixing the mash a wheat residue to form a paper/wheat mixture;
(e) Blending and mixing the paper/wheat mixture with a chemical binder according to claim 11 to form a paper-wheat composite.

84. A process as claimed in claim 83, wherein prior to blending and mixing the mash with the wheat residue the mash is held for a period between 12 to 24 hours.

85. A process as claimed in claimed 83, wherein the mash and the wheat residue are blended and mixed for a period between 15 minutes to 30 minutes.

86. A process as claimed in claim 83, wherein the paper/wheat mixture and the chemical binder are blended and mixed for a period between 15 minutes to 30 minutes.

87. A process as claimed in claim 83, wherein the paper is paper particles having a size of up to 5 millimeters.

88. A process as claimed in claim 83, wherein the paper is paper particles having a size of about 2 millimeters.

89. A process as claimed in claim 83, wherein the paper is aluminized paper.

90. A process as claimed in claim 83, wherein the paper is aluminized paper particles having a size of up to 5 millimeters.

91. A process as claimed in claim 83, wherein prior to placing the paper into the container, the paper is placed in a grinder;

and ground to form particlized paper of up to 5 mm in size.

92. A process as claimed in claim 91, wherein the particlized paper has a size of about 2 millimeters.

93. A process as claimed in claim 91, wherein the paper is aluminized paper.

94. A process as claimed in claim 83, wherein the amount of wheat residue is between 15% to 33% by volume of the paper-wheat composite.

95. A process as claimed in claim 83, wherein the amount of chemical binder is between 1% to 7% by volume of the paper-wheat composite.

96. A process as claimed in claim 83, further comprising the steps of:

Forming the paper-wheat composite into a shape; and

Curing the shaped paper-wheat composite to form a paper-wheat article.

97. A process as claimed in claim 96, further comprising the step of pressing the paper-wheat article.

98. A process as claimed in claim 97, wherein the paper-wheat article is pressed at a pressure between 10 kilograms and 200 kilograms per square centimeter.

99. A process as claimed in claim 96, wherein the paper-wheat composite is formed by extruding the paper-wheat composite and further comprises the step of pressing the shaped paper-wheat composite at a pressure between 10 kilograms and 200 kilograms per square centimeter.

100. A process for manufacturing a cement-rubber composite comprising the following steps:

(a) Heating a rubber product;

(b) Blending and mixing the rubber product with a chemical binder according to claim to form a rubber/binder mixture;

(c) Blending and mixing the rubber/binder mixture with a cement material to form a rubber/binder/cement mixture;

(d) Cooling the rubber/binder/cement mixture to about 50 degrees C. while continuing to mix;

(e) Blending and mixing the rubber/binder/cement mixture with a filler material to form the cement-rubber composite.

101. A process as claimed in claim 100, wherein the rubber product is particlized rubber having a size between 2 to 8 millimeters.

102. A process as claimed in claim 100, wherein the rubber product is particlized rubber and the particlized rubber is formed by:

Conducting the rubber product to a grinder, and

Grinding the rubber product to form a particlized rubber.

103. A process as claimed in claim 102, wherein the particilized rubber has a size between 2 to 8 millimeters.

104. A process as claimed in claim 100, wherein the rubber product is heated in a rotating oven.

105. A process as claimed in claim 100, wherein the rubber product is heated to a temperature between 100 and 150 degrees C.

106. A process as claimed in claim 100, wherein the rubber product is rotated and heated in a rotating oven at a temperature between 100 and 150 degrees C.

107. A process as claimed in claim 100, wherein the chemical binder is present in an amount of 3% to 8% by volume of the cement-rubber composite.

108. A process as claimed in claim 100, wherein the rubber product and the chemical binder is blended and mixed for a period of at least 60 minutes.

109. A process as claimed in claim 100, wherein the rubber product comprises 40% to 60% by volume of the cement-rubber composite.

110. A process as claimed in claim 100, wherein the cement material is portland cement.

111. A process as claimed in claim 100, wherein the cement material is present in an amount of 8% to 25% by volume of the cement-rubber composite.

112. A process as claimed in claim 100, wherein the rubber/binder mixture and the cement material are blended and mixed for a period between 10 minutes and 30 minutes.

113. A process as claimed in claim 100, wherein the filler is selected from the group consisting of ash, calcium hydroxide ($Ca(OH)_2$), hydrated lime (CaO), carbonated lime ($CaCO_3$), wheat residue and ground yucca.

114. A process as claimed in claim 100, wherein the filler is in an amount of 25% to 35% by volume of the cement-rubber composite.

115. A process as claimed in claim 100, wherein the rubber/binder/cement mixture and the filler are blended and mixed for a period between 5 minutes to 15 minutes.

116. A process as claimed in claim 100, further comprising the steps of:

Forming the cement-rubber composite into a shape; and

Curing the shaped cement-rubber composite to form a cement-rubber article.

117. A process as claimed in claim 115, further comprising the step of pressing the cement-rubber article.

118. A process as claimed in claim 116, wherein the cement-rubber article is pressed at a pressure between 10 kilograms and 200 kilograms per square centimeter.

119. A process as claimed in claim 115, wherein the cement-rubber composite is formed by extruding the cement-rubber composite and further comprises the step of pressing the shaped cement-rubber composite at a pressure between 10 kilograms and 200 kilograms per square centimeter.

* * * * *